United States Patent
Yonetsuji

(10) Patent No.: US 12,361,695 B2
(45) Date of Patent: *Jul. 15, 2025

(54) INFORMATION PROCESSING DEVICE, INFORMATION PROCESSING PROGRAM, AND INFORMATION PROCESSING METHOD

(71) Applicant: Preferred Networks, Inc., Tokyo (JP)

(72) Inventor: Taizan Yonetsuji, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 523 days.

This patent is subject to a terminal disclaimer.

(21) Appl. No.: 17/714,970

(22) Filed: Apr. 6, 2022

(65) Prior Publication Data

US 2022/0230025 A1    Jul. 21, 2022

Related U.S. Application Data

(63) Continuation of application No. 16/232,495, filed on Dec. 26, 2018, now Pat. No. 11,321,584.

(30) Foreign Application Priority Data

Dec. 26, 2017 (JP) .................. 2017-248963

(51) Int. Cl.
| | | |
|---|---|---|
| *G06T 11/00* | (2006.01) | |
| *G06F 18/40* | (2023.01) | |
| *G06V 10/778* | (2022.01) | |
| *G06V 10/82* | (2022.01) | |
| *H04N 1/60* | (2006.01) | |

(52) U.S. Cl.
CPC .............. *G06V 10/82* (2022.01); *G06F 18/41* (2023.01); *G06T 11/00* (2013.01); *G06V 10/7788* (2022.01); *H04N 1/6027* (2013.01); *H04N 1/60* (2013.01)

(58) Field of Classification Search
None
See application file for complete search history.

(56) References Cited

U.S. PATENT DOCUMENTS

| | | | |
|---|---|---|---|
| 5,134,396 A | 7/1992 | Sirat et al. | |
| 10,706,351 B2 | 7/2020 | Rainwater | |
| 2003/0016242 A1* | 1/2003 | Ramahefarivony | .. G06F 16/958 707/E17.116 |

(Continued)

FOREIGN PATENT DOCUMENTS

| | | | |
|---|---|---|---|
| JP | H02-303220 A | 12/1990 | |
| JP | H09-237355 A | 9/1997 | |

(Continued)

OTHER PUBLICATIONS

Advisory Action issued on Oct. 9, 2020, in U.S. Appl. No. 16/232,495.

(Continued)

*Primary Examiner* — Yanna Wu
(74) *Attorney, Agent, or Firm* — Foley & Lardner LLP

(57) ABSTRACT

An information processing device includes a memory, and processing circuitry coupled to the memory. The processing circuitry is configured to acquire gradation processing target image data, and perform gradation processing on the gradation processing target image data based on a learned model learned in advance.

37 Claims, 8 Drawing Sheets

(56) References Cited

U.S. PATENT DOCUMENTS

| | | | |
|---|---|---|---|
| 2010/0094696 | A1 | 4/2010 | Molinelli et al. |
| 2010/0119153 | A1 | 5/2010 | Rai |
| 2016/0127630 | A1 | 5/2016 | Kitajima |
| 2017/0076438 | A1* | 3/2017 | Kottenstette ............ G06V 10/82 |
| 2018/0122090 | A1 | 5/2018 | Ha et al. |
| 2018/0308281 | A1* | 10/2018 | Okoyama ............... G06V 20/64 |
| 2018/0359416 | A1* | 12/2018 | Hold-Geoffroy ...... G06V 10/82 |
| 2019/0051039 | A1 | 2/2019 | Tsuru et al. |
| 2019/0110198 | A1* | 4/2019 | LeCun ................... H04N 19/70 |
| 2019/0188535 | A1* | 6/2019 | Chen ......................... G06T 5/60 |
| 2019/0318534 | A1* | 10/2019 | Mory ...................... G06T 15/08 |

FOREIGN PATENT DOCUMENTS

| | | |
|---|---|---|
| JP | 2000-020680 A | 1/2000 |
| JP | 2007-147871 A | 6/2007 |
| JP | 2012-043004 A | 3/2012 |

OTHER PUBLICATIONS

"Cel shading" Wikipedia, (retrieved 2019) available on the Internet, <URL: https://en.wikipedia.org/wiki/Cel_shading>.

Archive of "Cell Shading" Wikipedia, (capture Dec. 2, 2017) Available on the Internet <URL: https://web.archive.org/web/20171202210839/https://en.wikipedia.org/wiki/Cel_shading>.

Final Office Action in U.S. Appl. No. 16/232,495 dated Jun. 30, 2020.

Final Office Action in U.S. Appl. No. 16/232,495 dated Jul. 28, 2021.

Gu et al. ("Image Shadow Removal Using Pulse Coupled Neural Network") IEEE Transactions on Neural Networks, vol. 16, No. 3, May 2005 (Year: 2005).

Iizuka et al., "Let there be Color !: Joint End-to-end Learning of Global and Local Image Priors for Automatic Image Colorization with Simultaneous Classification," ACM Transaction on Graphics (Proc. of SIGGRAPH), vol. 35, No. 4, Section 110, (2016) Available on the Internet <URL: http://hi.cs.waseda.ac.jp/~iizuka/projects/colorization/ja/>.

Iizuka et al., "Neural Network-based Automatic Image Colorization," Available on the Internet <URL: http://hi.cs.waseda.ac.jp:8082/>.

Kawanaka et al., "Color Photometric Stereo and Virtual Image Rendering Using Neural Network," IEICE Transactions on Information and Systems, Japan Institute of Electronics, Information and Communication Engineers, vol. J89-D No. 2, pp. 381-392 (2006).

Non-Final Office Action in U.S. Appl. No. 16/232,495 dated Mar. 11, 2020.

Non-Final Office Action in U.S. Appl. No. 16/232,495 dated Dec. 3, 2020.

Sangkloy et al., "Scribbler: Controlling Deep Image Synthesis with Sketch and Color," arXiv:1612.00835v2 [cs.CV] (Dec. 5, 2016), Available on the Internet <URL: https://arxiv.org/pdf/1612.00835.pdf>.

Notice of Allowance in U.S. Appl. No. 16/232,495 dated Jan. 7, 2022.

Yuki Odagiri et al., "Automatic color of cartoons by convolutional neural network using color features as input," DEIM Forum 2017 B3-4, (2017) Available online, URL: https://db-event.jpn.org/deim2017/proceedings.html.

Peiran Ren et al., "Image Based Relighting Using Neural Networks," ACM Transactions on Graphics (TOG), vol. 34, No. 4, Article 111, pp. 1-12, Aug. 2015, https://doi.org/10.1145/2766899.

* cited by examiner

DESIGNATION FOR LIGHT SOURCE
DIRECTION IS TWO-DIMENSIONALLY RECEIVED

DESIGNATION FOR LIGHT SOURCE
DIRECTION IS THREE-DIMENSIONALLY RECEIVED

INFORMATION PROCESSING DEVICE, INFORMATION PROCESSING PROGRAM, AND INFORMATION PROCESSING METHOD

CROSS-REFERENCE TO RELATED APPLICATIONS

This application is a continuation of U.S. application Ser. No. 16/232,495, filed on Dec. 26, 2018, which claims the benefit of and priority to Japanese Patent Application No. 2017-248963, filed on Dec. 26, 2017, the entire contents of which are incorporated herein by reference.

TECHNICAL FIELD

Embodiments of the present disclosure relate to an information processing device, an information processing program, and an information processing method capable of automatically performing gradation processing on image data.

BACKGROUND

In recent years, machine learning using a neural network having a multilayer structure, called deep learning has been applied in various fields. The machine learning has also been prominently utilized and has achieved a remarkable result in a field of image processing such as image recognition and image generation.

For example, "Automatic coloring of black-and-white photograph by learning of global feature and local feature using deep network" (Satoshi Iizuka, Simosela Edgar, and Hiroshi Ishikawa) (http://hi.cs.waseda.ac.jp/~iizuka/projects/colorization/ja/) achieves processing of automatic coloring of a black-and-white photograph by a deep network, and achieves coloring processing of the black-and-white photograph by machine learning.

As in "Automatic coloring of black-and-white photograph by learning of global feature and local feature using deep network" (Satoshi Iizuka, Simosela Edgar, and Hiroshi Ishikawa) (http://hi.cs.waseda.ac.jp/~iizuka/projects/colorization/ja/), in addition to a need for users to perform coloring on image data, there is a need for users to perform gradation processing on image data such as line drawing data that does not include gradation information or to adjust gradation of image data that already includes gradation information. Here, the gradation processing refers to shadow color processing for adding a shadow, oblique line processing for applying expression by an oblique line to a portion that becomes a shadow, tone processing for adding a tone used for comics and the like, highlight processing for changing a part of the shadow that has already applied, tone conversion processing for converting a tone place of an image to which a tone is added into gray scale expression, special print processing for generating data used for special printing such as embossing processing or gold foil processing and the like. Conventionally, a process of completing an image by performing the gradation processing on the image data has been performed by a skilled person, but there was a problem that a target number of sheets cannot be treated (gradation-processed) in a limited time in the case of work by a human hand. For this reason, a structure capable of automatically performing the gradation processing has been demanded.

SUMMARY

Embodiments of the present disclosure have been made in consideration of the problems described above, and an object of the present disclosure is to provide an information processing device, an information processing program, and an information processing method capable of automatically performing gradation processing. The terms "learned model" and "trained model" as used in the present disclosure to describe various embodiments may be used interchangeably with each other. Similarly, the terms "learned" and "trained" as used in the present disclosure to describe various embodiments may be used interchangeably with each other.

An information processing device according to some embodiments of the present disclosure may include a gradation processing target image data acquiring unit configured to acquire gradation processing target image data, and a gradation processing unit configured to perform gradation processing on the gradation processing target image data based on a learned model learned in advance.

An information processing device according to some embodiments of the present disclosure may include a gradation processing target image data acquiring unit configured to acquire gradation processing target image data, and a gradation processing unit configured to output at least one or more mask channels for performing gradation processing on the gradation processing target image data based on a learned model learned in advance.

In addition, the information processing device according to some embodiments of the present disclosure may further include a processing content designation receiving unit configured to receive one or more designated gradation processing contents which is selected by a user from a plurality of gradation processing contents. The gradation processing unit may perform the gradation processing on the gradation processing target image data based on a learned model corresponding to a designated gradation processing content received by the processing content designation receiving unit among a plurality of learned models learned in advance.

In addition, the information processing device according to some embodiments of the present disclosure may further include a processing content designation receiving unit configured to receive one or more designated gradation processing contents which is selected by a user from a plurality of gradation processing contents. The gradation processing unit may output at least one or more mask channels for performing the designated gradation processing on the gradation processing target image data based on a learned model corresponding to a designated gradation processing content received by the processing content designation receiving unit among a plurality of learned models learned in advance.

In addition, the information processing device according to some embodiments of the present disclosure may further include a hint information acquiring unit configured to acquire hint information of gradation processing on at least one place of the gradation processing target image data. The gradation processing unit may execute processing based on the gradation processing target image data and the hint information.

In addition, in the information processing device according to some embodiments of the present disclosure, the learned model may perform learning based on both of training data to which the hint information of the gradation processing is not given and training data to which the hint information of the gradation processing on at least one place of the gradation processing target image data is given.

In addition, the information processing device according to some embodiments of the present disclosure may further include a light source position information acquiring unit configured to acquire light source position information from a user for designating a position of a light source for the gradation processing target image data. The gradation processing unit may execute processing based on the gradation processing target image data and the light source position information.

In addition, in the information processing device according to some embodiments of the present disclosure, the learned model may perform learning based on both of training data to which the light source position information is not given and training data to which the light source position information on at least one place of the gradation processing target image data is given.

An information processing program according to some embodiments of the present disclosure may cause a computer or a processor to achieve the following functions: a gradation processing target image data acquiring function of acquiring gradation processing target image data, and a gradation processing function of performing gradation processing on the gradation processing target image data based on a learned model learned in advance.

An information processing method according to some embodiments of the present disclosure may include a gradation processing target image data acquiring step of acquiring gradation processing target image data, and a gradation processing step of performing gradation processing on the gradation processing target image data based on a learned model learned in advance.

An information processing device according to some embodiments of the present disclosure may include a gradation processing target image data input form displaying unit configured to display a form region for a user to input gradation processing target image data on a display screen, a gradation processing target image displaying unit configured to display an image indicated by the input gradation processing target image data in a gradation processing target image display region provided on the display screen, and a gradation-processed image displaying unit configured to display an image indicated by gradation-processed image data obtained by performing gradation processing on the gradation processing target image data based on a learned model learned in advance, in a gradation-processed image display region provided on the display screen.

In addition, the information processing device according to some embodiments of the present disclosure may further include a hint information input tool displaying unit configured to display a hint information input tool on the display screen and receive input of hint information, the hint information input tool being configured to designate a place at which the gradation processing is to be performed on the image indicated by the gradation processing target image data, displayed in the gradation processing target image display region. The gradation-processed image displaying unit may display the image indicated by the gradation-processed image data obtained by performing the gradation processing on the gradation processing target image data in a state in which the hint information is input, based on a learned model learned in advance, in the gradation-processed image display region provided on the display screen.

In addition, the information processing device according to some embodiments of the present disclosure may further include a light source position information input tool displaying unit configured to display a light source position information input tool on the display screen and receive input of light source position information, the light source position information input tool being configured to designate a light source position for the image indicated by the gradation processing target image data, displayed in the gradation processing target image display region. The gradation-processed image displaying unit may display the image indicated by the gradation-processed image data obtained by performing the gradation processing on the gradation processing target image data in a state in which the light source position information is input, based on a learned model learned in advance, in the gradation-processed image display region provided on the display screen.

According to some embodiments of the present disclosure, it is possible to automatically perform the gradation processing on the gradation processing target image data based on the learned model learned in advance using the training data with respect to the gradation processing for the gradation processing target image data. In addition, it is possible to properly perform the gradation processing after giving the hint information on the position at which the gradation processing is performed on the acquired gradation processing target image data or the light source position information for designating the light source position. It is possible to perform the gradation processing in which the hint information or the light source position information is designated for the gradation processing target image data by advancing the learning in a form in which the designation for the hint information or the light source position information is included in the learning process of the learned model used for the gradation processing.

In addition, according to the present disclosure, since the gradation processing target image display region and the gradation-processed image display region are displayed on the display screen viewed by the user by the information processing device, the user can compare and observe the original gradation processing target image data and the gradation-processed image data, and thus, it is possible to directly compare an atmosphere of an image before the gradation processing and an atmosphere of an image changed after the gradation processing with each other. In addition, the hint information for designating the place at which the gradation processing should be performed on the gradation processing target image indicated by the gradation processing target image data displayed in the gradation processing target image display region or the light source position information can be input, such that the gradation processing can be executed in a state in which the hint information or the light source position information is added. Therefore, it is possible to give the hint information on the place at which the user desires to freely perform the gradation processing on the gradation processing target image or the light source position information to execute the gradation processing.

DETAILED DESCRIPTION

The terms "learned model" and "trained model" as used in the present disclosure to describe various embodiments may be used interchangeably with each other. Similarly, the terms "learned" and "trained" as used in the present disclosure to describe various embodiments may be used interchangeably with each other.

First Embodiment

Figure 1:
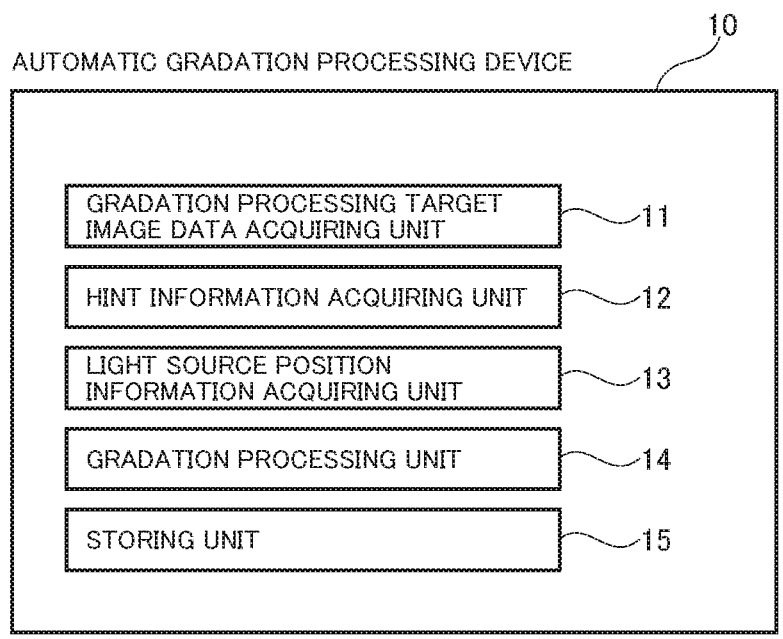
FIG. 1 is a block diagram showing a configuration of an automatic gradation processing device according to a first embodiment of the present disclosure.

Hereinafter, an example of an automatic gradation processing device according to a first embodiment of an information processing device of the present disclosure will be described with reference to the drawings. FIG. 1 is a block diagram showing a configuration of an automatic gradation processing device 10 according to some embodiments of the present disclosure. As shown in FIG. 1, the automatic gradation processing device 10 includes at least a gradation processing target image data acquiring unit 11, a hint information acquiring unit 12, a light source position information acquiring unit 13, a gradation processing unit 14, a storing unit 15, and a processing content designation receiving unit (not shown). The storing unit 15 may be implemented with EPROM, EEPROM, SDRAM, and flash memory devices, CD ROM, DVD-ROM, or Blu-Ray® discs and the like. At least one or more of the gradation processing target image data acquiring unit 11, the hint information acquiring unit 12, the light source position information acquiring unit 13, the gradation processing unit 14, and the processing content designation receiving unit may be implemented with a special circuit (e.g., processing circuitry of a FPGA or the like), a subroutine in a program stored in memory (e.g., EPROM, EEPROM, SDRAM, and flash memory devices, CD ROM, DVD-ROM, or Blu-Ray® discs and the like) and executable by a processor (e.g., CPU, GPU and the like), or the like.

Figure 2:
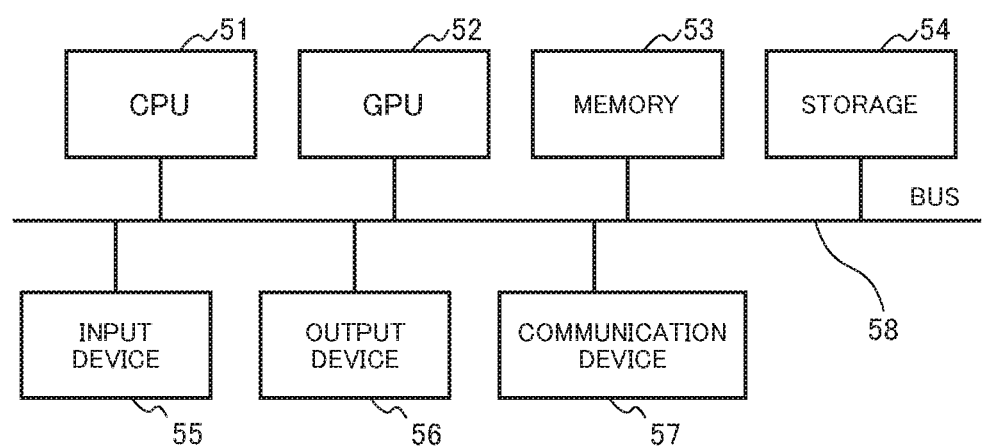
FIG. 2 is a block diagram showing a hardware configuration required for realizing the automatic gradation processing device.

In some embodiments, the automatic gradation processing device 10 may be a device designed as a dedicated machine. In some embodiments, the automatic gradation processing device 10 may be a device that can be achieved by a general computer. FIG. 2 is a block diagram showing a hardware configuration required for realizing the automatic gradation processing device 10. In some embodiments, as shown in FIG. 2, the automatic gradation processing device 10 includes a central processing unit (CPU) 51, a graphics processing unit (GPU) 52, a memory 53, and a storage 54 such as a hard disk drive or a solid state drive (SSD), which are generally included in a general computer, and includes an input device 55 such as a mouse and a keyboard, an output device 56 such as a display (or a display screen) and a printer, and a communication device 57 for connection with a communication network, and these components are connected to each other through a bus 58.

Figure 3:
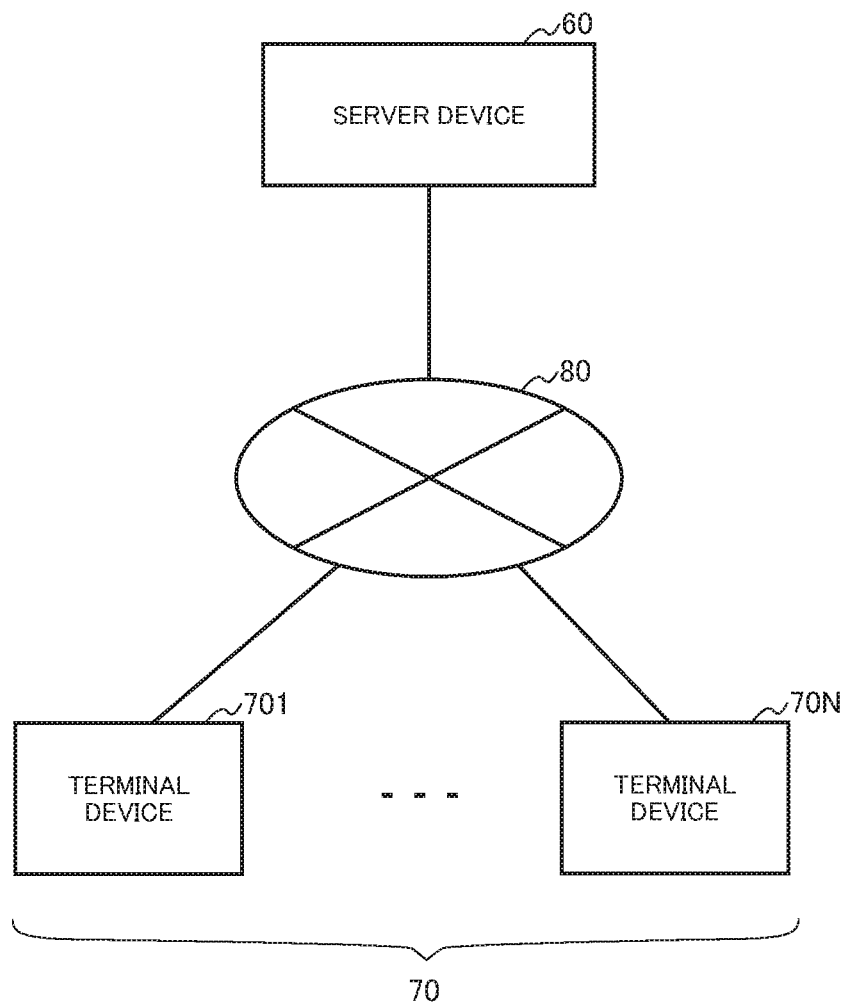
FIG. 3 is a block diagram showing an example of a system configuration for the automatic gradation processing device.

FIG. 3 is a block diagram showing an example of a system configuration for the automatic gradation processing device 10. In FIG. 3, a server device 60 and a terminal device 70 (or a plurality of terminal devices 70-1 to 70-*n*) are configured to be connectable to each other through a communication network 80. For example, in FIG. 3, the server device 60 may be allowed to function as the automatic gradation processing device 10 and any one of the plurality of terminal devices 70-1 to 70-*n* may be connected to the server device 60 functioning as the automatic gradation processing device 10 through the communication network to use the automatic gradation processing device 10. In this case, a configuration in which a graphical user interface program for using the automatic gradation processing device 10 is installed in the terminal device 70 may be adopted, a configuration in which a graphical user interface program on a server is used through a browser may be adopted, or an information processing device having a function of displaying various displays as a graphical user interface may be adopted.

In addition, the same device need not include all of the components of the automatic gradation processing device 10 to be described below, and some components are included in another device. For example, some components may be included, respectively, in the server device 60 and any one of the plurality of terminal devices 70-1 to 70-*n* connectable to each other through the communication network, such that the automatic gradation processing device 10 may use components in another device while performing communication. In addition, the server device 60 is not limited to a single server device 60, and a configuration using a plurality of server devices may be adopted. In addition, learned models to be described below may be distributed and included in the server device 60, the plurality of terminal devices 70-1 to 70-*n* and the like, as another device. In some embodiments, the automatic gradation processing device 10 may be connected to a device including a used learned model through the communication network each time it uses the used learned model. In some embodiments, the learned models are stored in a device as the automatic gradation processing device 10. In some embodiments, when a learned model stored by any learned model storage means can be used, it is not inquired whether the learned model storage means is included in the automatic gradation processing device 10 itself or is included in another device.

The gradation processing target image data acquiring unit 11 may have a function of acquiring gradation processing target image data. Here, the gradation processing in the first embodiment refers to at least one of shadow color processing for drawing a shadow in an image in which the shadow is not drawn, oblique line drawing processing for drawing oblique lines for expressing a shadow, tone processing for adding a tone to image data, highlight processing for changing a gradation of image data, tone conversion processing for converting a tone place of an image to which a tone is added into gray scale expression, special print processing for generating data used for special printing such as embossing processing or gold foil processing, or various processing for changing gradation information. In some embodiments, the gradation processing target image data may include image data to which a user desires to add gradation information from now, such as line drawing data that does not include gradation information and is drawn by binary of black and white. In some embodiments, the gradation processing target image data may include image data that already includes gradation information and is a target to further modify the gradation information, for example, a colored image, a shadow-processed image, a tone-added image, a photograph and the like. For example, the user may acquire the gradation processing target image data by the gradation processing target image data acquiring unit 11 (see FIG. 1) by selecting image data on which he/she desires to perform the gradation processing.

The hint information acquiring unit 12 may have a function of receiving and acquiring hint information including designation for at least one or more of places at which the user desires to perform the gradation processing on the gradation processing target image data, from the user. As an example of a method of designating the hint information by the user, the designation may be performed by a sequence of receiving designation for types of gradation processing such as the shadow color processing, the oblique line drawing processing, the tone processing, or the highlight processing and a sequence of designating places at which the user desires to perform the designated gradation processing for the gradation processing target image data displayed on a display screen. The method of designating the hint information may be performed by a processing content designation receiving unit, which may be provided as one of components of the automatic gradation processing device 10. In some embodiments, designation is not only performed for one type of gradation processing, but may also be simultaneously performed for two or more types of gradation processing, and designation for a place at which the gradation processing is performed in this case may be performed for a plurality of places. In some embodiments, when the gradation processing is executed without acquiring the hint information, the acquisition of the hint information in the hint information acquiring unit 12 can be omitted. The acquired hint information may be used for gradation processing in a gradation processing unit 14 to be described below. In some embodiments, the hint information acquiring unit 12 is not an essential component, and the gradation processing can be performed by a learned model learned using training data that does not include the hint information even though the hint information is not given.

The light source position information acquiring unit 13 may have a function of acquiring light source position information in the case of giving the light source position information when the gradation processing is performed on the gradation processing target image data. The gradation processing can be performed by depicting an influence from a virtual light source on the gradation processing target image data, and a position at which the gradation processing is performed may be changed depending on where a light source is positioned. Therefore, the light source position information may be given for the gradation processing target image data. As a method of giving the light source position information for the gradation processing target image data, various methods can be considered. For example, the method of giving the light source position information to the gradation processing target image data may include a method of designating a light source position by the user. In some embodiments, the method of giving the light source position information to the gradation processing target image data may include a method of automatically discriminating the light source position in the gradation processing target image data based on a learned model for discriminating a light source position in which it is learned in advance to discriminate the light source position in the gradation processing target image data. The acquired light source position information may be used for gradation processing in a gradation processing unit 14 to be described below. In some embodiments, the light source position information acquiring unit 13 is not an essential component, and the gradation processing can be performed by a learned model which may be learned using training data that does not include the light source position information even though the light source position information is not given. In some embodiments, when light source position information disagreeing with the hint information acquired by the hint information acquiring unit 12 is designated, because there is a risk that gradation processing in which both of the hint information and the light source position information are reflected cannot be executed, any one of the hint information and the light source position information may be prioritized.

Figure 5A:
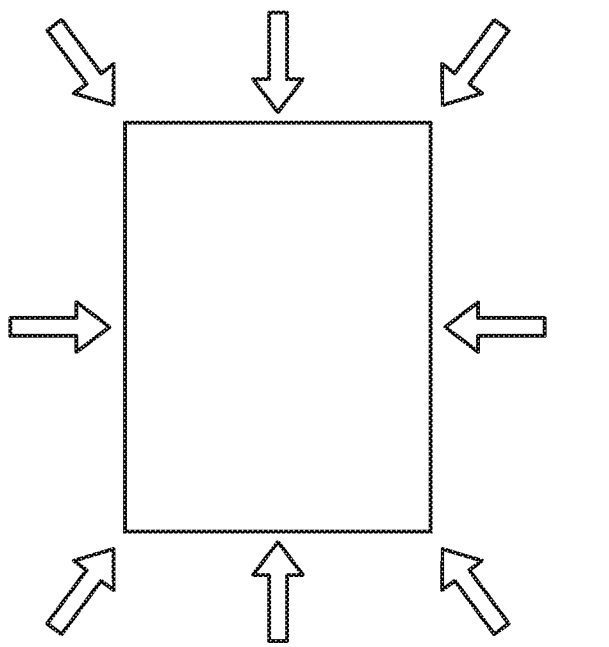
FIGS. 5A and 5B are explanatory diagrams showing a method of giving light source position information for gradation processing target image data.
Figure 5B:
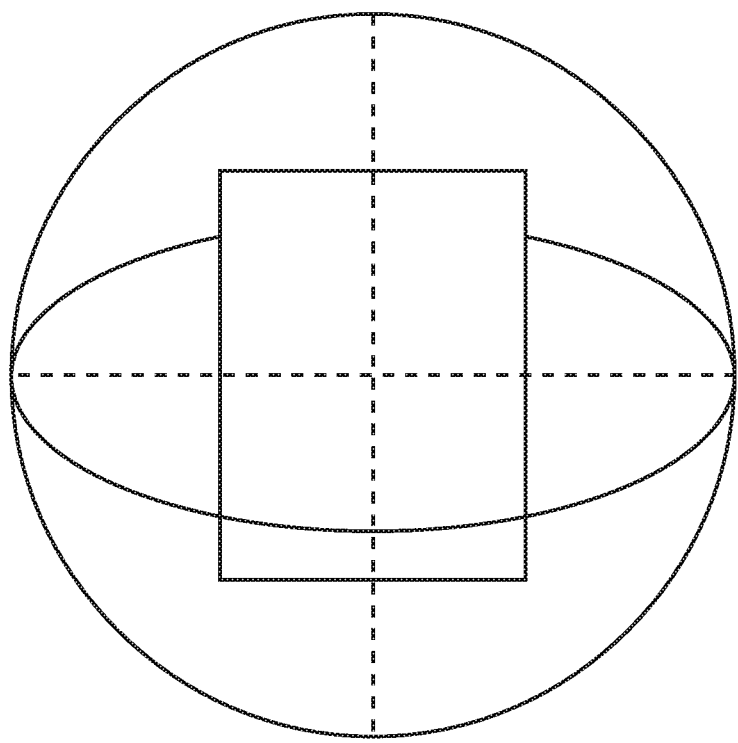

FIGS. 5A and 5B are explanatory diagrams showing a method of giving light source position information for gradation processing target image data. FIG. 5A is an explanatory diagram showing a case in which the light source position information is two-dimensionally given for the gradation processing target image data 500, and FIG. 5B is an explanatory diagram showing a case in which the light source position information is three-dimensionally given for the gradation processing target image data 500. In the case in which the light source position information is given two-dimensionally as shown in FIG. 5A, the light source position information from any direction on the same plane as that of the gradation processing target image data is given. In the case in which the light source position information is three-dimensionally given as shown in FIG. 5B, the light source position information is given by designating any position on a surface of a sphere 600 centering on the gradation processing target image data. In either case of FIG. 5A or FIG. 5B, designation places of the light source position information may be set to be designated in advance based on predetermined divisions. For example, in the case in which the light source position information is two-dimensionally given, the designation places of the light source position information may be set to eight directions 510 as shown in FIG. 5A, may be set to sixteen directions of double fineness, or may be set to be more finely designated. In the case in which the light source position information is three-dimensionally given, the designation places of the light source position information may be set to a total of 64 directions divided into eight directions (x-y plane, e.g., a plane 610 in FIG. 5B)×eight directions (x-z plane), may be set to a total of 256 directions divided into sixteen directions (x-y plane)×sixteen directions (x-z plane), or may be set to be more finely designated. As described above, the designation may be received from the directions of the predetermined divisions, such that it is possible to perform the gradation processing using an example learned based on training data. In some embodiments, the training data includes a tag of light source position information of directions of the same divisions in a learned model.

The gradation processing unit 14 may have a function of outputting at least one or more mask channels for performing the gradation processing on the gradation processing target image data, based on a learned model in which a mask channel overlapped with the gradation processing target image data is learned in advance using training data to generate a gradation processing result as the mask channel. In order to execute the gradation processing in the gradation processing unit 14, designation for at least one type of the gradation processing target image data and a gradation processing content may be given to the gradation processing unit 14. In some embodiments, the hint information, which is acquired by the hint information acquiring unit 12, on the position at which the gradation processing is performed, or the light source position information acquired by the light source position information acquiring unit 13 may be given to the gradation processing unit 14. The gradation processing unit 14 to which these pieces of information is given may execute the gradation processing using a learned model in which it is learned in advance to perform the gradation processing. For some gradation processing such as the shadow color processing, it is possible to perform image processing directly on the gradation processing target image data without outputting a mask channel. In processing for expressing a predetermined range with a specific texture, such as the tone processing, a mask channel for instructing a type and a place of tone to be applied may be outputted. Based on information of the mask channel output from a learned model, the automatic gradation processing device 10 may perform actual tone addition processing and the like, or may add a tone to a layer different from the gradation processing target image data using a layer to be described below. In some embodiments, the server device as the automatic gradation processing device 10 may execute these processing, or the terminal device as the automatic gradation processing device 10 may acquire a mask channel outputted from a learned model on the server device and perform the actual tone adding processing and the like.

Figure 4:
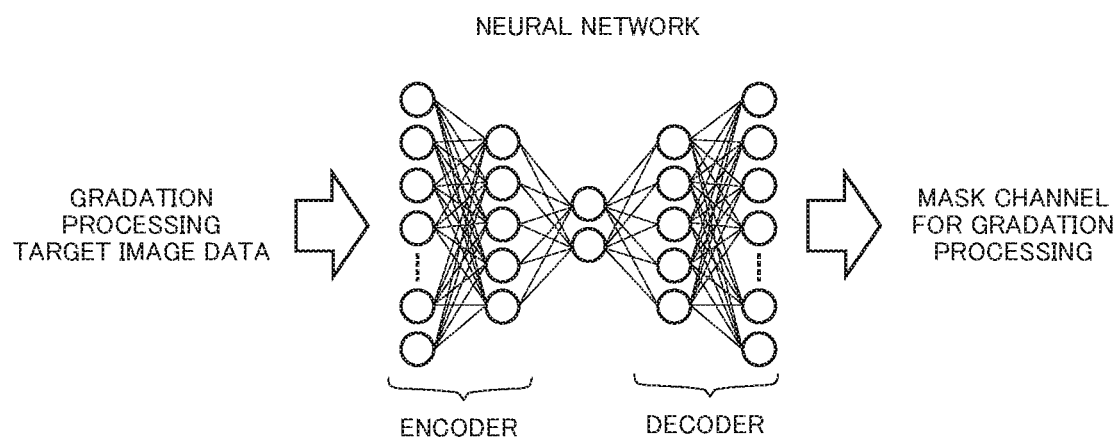
FIG. 4 is an explanatory diagram showing a concept of a neural network.

Here, a learning method of the learned model will be described. The learned model may be a model for learning to output at least one or more mask channels for performing the gradation processing using the gradation processing target image data as an input, and may refer to, for example, a model composed of a neural network including a convolutional neural network (CNN). FIG. 4 is an explanatory diagram showing a concept of a neural network. A model for learning can be composed of, for example, an encoder that extracts an abstract feature quantity of the input gradation processing target image data and a decoder that outputs a mask channel for gradation processing based on the extracted feature quantity. This is only an example, and various configurations of the neural network can be applied. Learning is performed on the neural network having such a configuration.

At the time of the learning, training data may be used. As the training data, for example, gradation processing target image data and correct answer image data in which gradation processing is performed on the gradation processing target image data are used as one set. In some embodiments, the gradation processing target image data set in the training data includes various image data such as line drawing data, a colored image, shadow-processed image, a tone-added image, a photograph and the like. In some embodiments, the correct answer image data in which the gradation processing is performed on the gradation processing target image data is prepared together with gradation processing target image data. In some embodiments, the gradation processing target image data and the correct answer image data are set as a set of training data. In the learning processing, the gradation processing target image data may be input to a model that the user desires to learn, and a gradation processing result may be outputted as a mask channel. A loss function may be calculated using gradation-processed image data obtained by overlapping the mask channel of the gradation processing result with the gradation processing target image data and the correct answer image data, and a parameter of the neural network may be updated in a direction in which loss is reduced. A learned model may be obtained by executing the update of the parameter as described above based on a plurality of training data.

In some embodiments, at the time of the learning, hint information on a position at which the gradation processing is performed may be given together with the gradation processing target image data to perform the learning, thereby learning gradation processing with the hint information. For example, a position picked up randomly from the correct answer image data or gradation information generated from the correct answer image data may be input as the hint information together with the gradation processing target image data to a model to perform the learning of the model. In this case, it is preferable that the number of given hint information is randomly switched from 0 to a finite predetermined number to execute the learning, thereby performing the learning so that a learned model can perform the gradation processing in the same manner in the case in which the number of hint information is 0 and in the case in which a plurality of hint information is given.

In some embodiments, at the time of the learning, the light source position information may be given together with the gradation processing target image data to perform the learning, thereby learning gradation processing with the light source position information. The light source position information in the correct answer image data may be extracted, and the extracted light source position information may be input together with the gradation processing target image data to the model to perform learning of the model. The light source position information may be information such as tag information. In some embodiments, the light source position information may be designated based on predetermined divisions. Learning with designation for the light source position information from various directions may be sufficiently performed, such that it is possible to perform the gradation processing regardless of a designated direction. In some embodiments, the light source position information may be mechanically produced from 3D data or 2D data. In some embodiments, the light source position information need not necessarily designate an accurate position, and may be rough information such as backlight.

In addition, in the description of the learning, the description has been made as a method common to all types of gradation processing, but elements specific to each gradation processing may also exist. The shadow color processing and the highlight processing may be processing for realizing expression of a shadow or highlight by making gradation information (e.g., brightness information) different from that of the surroundings in the final gradation-processed image data of the gradation processing target image data. On the other hand, the tone processing may be processing for adding a tone by determining a place at which the processing is performed and determining which of plural types of tones that exist are to be used to perform the processing. That is, in the case of the tone processing, a set of effective classes of which the number corresponds to the number of types of tones may be set, and the processing may be performed by the neural network as a classification problem of effective classes on the gradation-processed image data, such that processing of a tone corresponding to a class having the highest possibility is performed on each place of the gradation-processed image data. In some embodiments, in order to simultaneously perform processing by plural types of tones, a mask channel may be prepared for each class, and a plurality of tones processed using a plurality of mask channels may be finally overlapped with the gradation-processed image data, thereby obtaining the gradation-processed image data. In other gradation processing including the shadow color processing, the highlight processing, the oblique line drawing processing and the like, as well as the tone processing, a set of a plurality of effective classes depending on the number of types of processing methods may be set, and the processing may be performed by the neural network as a classification problem of the effective classes, thereby freely using the processing methods.

In some embodiments, in generation of the learned model, the learning may be performed for each type of gradation processing such as the shadow color processing, the highlight processing, the oblique line drawing processing, and the tone processing to obtain the learned model. In a step in which designation for at least one type of gradation processing contents is given at the time of performing the gradation processing, a learned model for the gradation processing contents may be used. The automatic gradation processing device 10 may be an automatic gradation processing device specialized for one type of gradation processing, and in this case, only a learned model relating to one type of gradation processing may be generated and stored.

The storing unit 15 has a function of storing data necessary for various types of processing performed in the automatic gradation processing device 10 including the gradation processing target image data acquiring unit 11, the hint information acquiring unit 12, the light source position information acquiring unit 13, and the gradation processing unit 14 and the like, and data obtained as a processing result. In addition, a learned model for each type of gradation processing obtained by performing the learning in advance may be stored in the storing unit 15.

Figure 6:
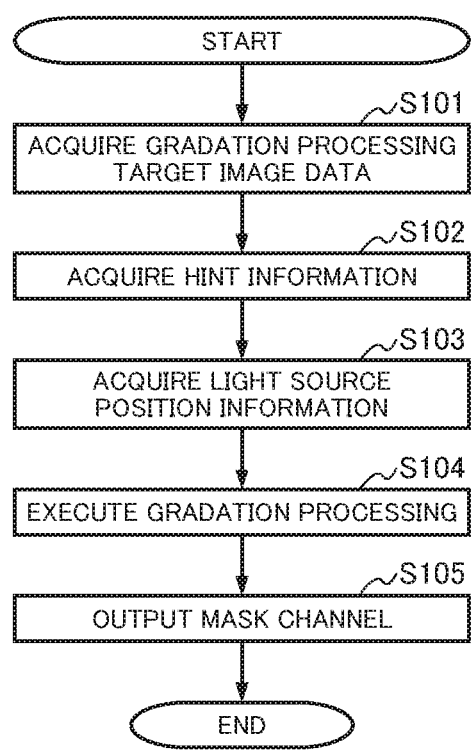
FIG. 6 is a flowchart showing a flow of gradation processing in the automatic gradation processing device according to the first embodiment.

Next, a flow of gradation processing in the automatic gradation processing device 10 according to the first embodiment will be described. FIG. 6 is a flowchart showing a flow of gradation processing in the automatic gradation processing device 10 according to the first embodiment. The gradation processing in the automatic gradation processing device 10 according to the first embodiment is started by acquiring the gradation processing target image data (step S101). For example, the user can select the gradation processing target image data, such that the acquisition of the gradation processing target image data is performed. A gradation processing content that the user desires to apply to the gradation processing target image data may be determined before the gradation processing target image data is acquired or may be determined after the gradation processing target image data is acquired.

After the gradation processing target image data is acquired, the hint information on the gradation processing for the gradation processing target image data may be acquired (step S102). The hint information may be information including designation for a position of the gradation processing target image data to which the determined gradation processing content is to be applied. In some embodiments, the designation is not only performed for one type of gradation processing, but may also performed at the same timing for two or more types of gradation processing. In this case, the hint information may include information relating to determination for a type of gradation processing and designation for a place at which the gradation processing is performed. In some embodiments, the gradation processing can be executed even though the hint information is not input.

Next, the light source position information on the gradation processing target image data may be acquired (step S103). The light source position information may be information designated by the user, or may be information acquired by automatically discriminating a light source position in the gradation processing target image data based on a learned model for discriminating a light source position. In some embodiments, the gradation processing can be executed even though the light source position information is not input.

Then, the gradation processing may be executed on the gradation processing target image data (step S104). The gradation processing may be executed by inputting the gradation processing target image data, the hint information, and the light source position information to a learned model corresponding to the determined gradation processing content. Then, the automatic gradation processing device 10 may output at least one or more mask channels for performing the gradation processing as the gradation processing result from the learned model (step S105), and may end the gradation processing.

As described above, with the automatic gradation processing device 10 according to the first embodiment, it is possible to properly perform the gradation processing after giving the hint information on the position at which the gradation processing is performed on the acquired gradation processing target image data or the light source position information for designating the light source position. It is possible to perform the gradation processing in which the hint information or the light source position information is designated for the gradation processing target image data by advancing the learning in a form in which designation for the hint information or the light source position information is included in a learning process of the learned model used for the gradation processing.

Second Embodiment

Hereinafter, an information processing device according to a second embodiment will be described with reference to the drawings. In the first embodiment, the automatic gradation processing device 10 has been described, but in the second embodiment, an information processing device for providing a graphical user interface used at the time of using the automatic gradation processing device 10 according to the first embodiment will be described. The information processing device according to the second embodiment will be described as providing a graphical user interface as an automatic gradation processing tool. For example, a method of providing a server device functioning as the automatic gradation processing device 10 according to the first embodiment and providing an automatic gradation processing tool to a user who has accessed the server device from a terminal device through a communication network can be considered. In such a case, the automatic gradation processing tool is not limited to being provided to the terminal device by software of a package, and can also be provided by being read and functioning by a browser or the like, causing a graphical user interface (GUI) stored in the server device to be displayed on a display of the terminal device. The automatic gradation processing tool refers to a tool used when a user uses the automatic gradation processing device 10 according to the first embodiment, and various providing patterns of the automatic gradation processing tool such as a case in which the automatic gradation processing tool is provided as an independent program, a case in which the automatic gradation processing tool is provided as a Web browser, and a case in which the automatic gradation processing tool is included as some functions of software of a package such as image editing software can be considered.

As described below, according to the second embodiment, at least one or more learned models are stored in the server device functioning as the automatic gradation processing device 10 and the automatic gradation processing tool is used by accessing the server device from the terminal device through the communication network, and a terminal device in which all of the learned models are stored can also use the same GUI.

Figure 7A:
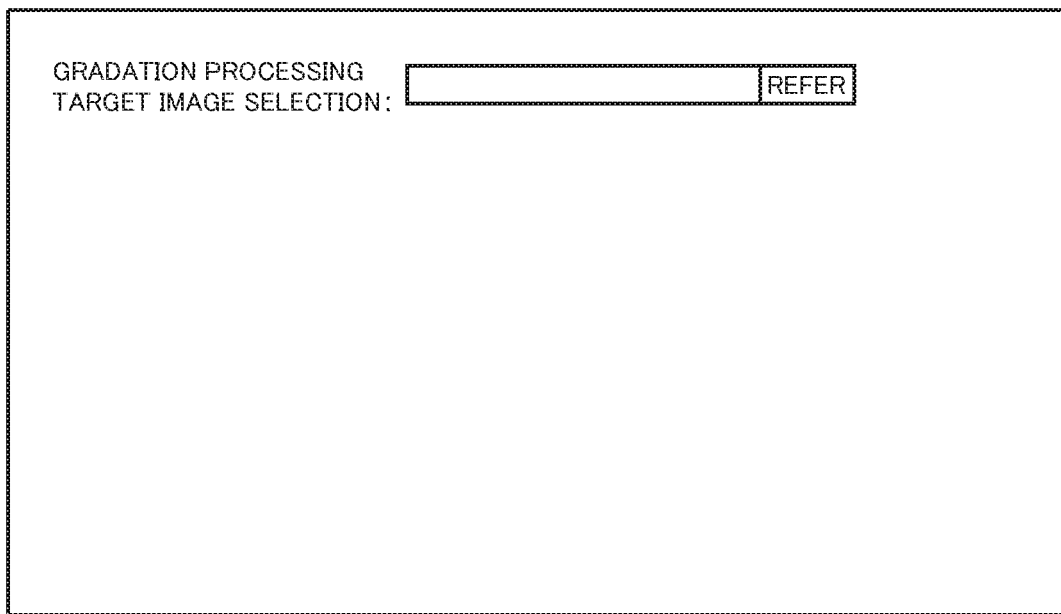
FIGS. 7A and 7B are explanatory diagrams showing an example of a display screen displayed by a program for a graphical user interface according to a second embodiment.
Figure 7B:
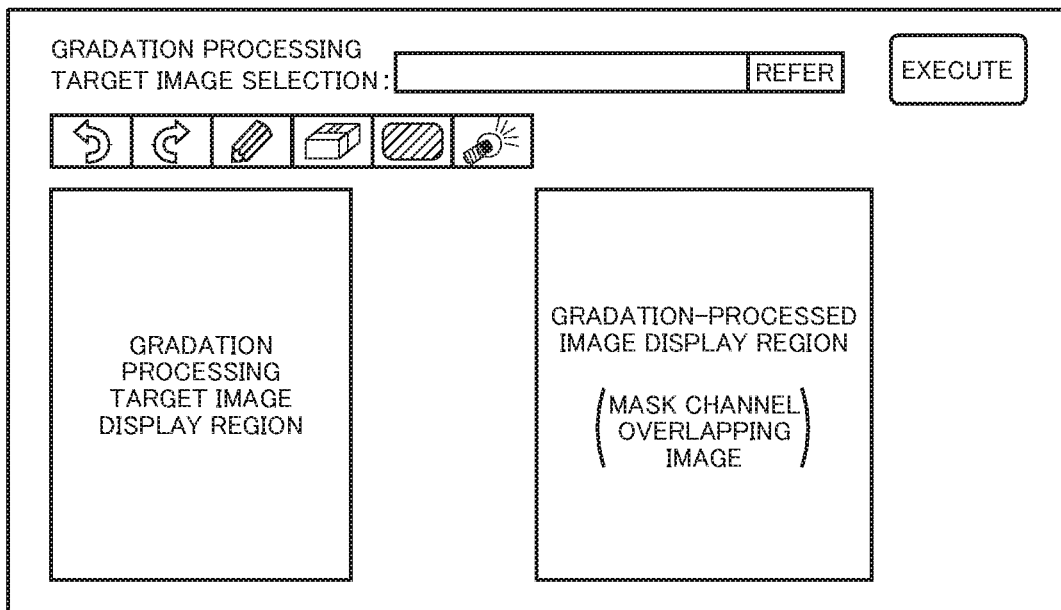

FIGS. 7A and 7B are explanatory diagrams showing an example of a display screen displayed by a GUI as an automatic gradation processing tool of the second embodiment. FIG. 7A shows a display screen 700 when gradation processing target image data is input, and FIG. 7B shows a display screen 800 as an example of hint information input tools, a gradation processing target image display region 880 for displaying gradation processing target image data, and a gradation-processed image display region 890 for displaying gradation-processed image data obtained by overlapping a mask channel of a gradation processing result with the gradation processing target image data. When the automatic gradation processing tool is provided from the server device to the terminal device (e.g., the automatic gradation processing tool is provided to a user who has accessed the server device from a terminal device through a communication network), first, as shown in FIG. 7A, a gradation processing target image data input form 3010, which is a form region for the user to input the gradation processing target image data, may be displayed on a display of the terminal device through, for example, a Web browser or the like. This gradation processing target image data input form may be a form in which the gradation processing target image data is inputted by a method of designating a path of a file in FIG. 7A, but is not limited thereto. For example, a method of selecting line drawing data by drag and drop may also be used. According to the second embodiment, the display screen can be displayed to the user when the server device provides a GUI as an automatic gradation processing tool by a program for a graphical user interface, a Web browser or the like. In some embodiments, the display screen may include both of a display screen generated by the server device and a display screen generated by the terminal device.

When the gradation processing target image data is designated, an image represented by the gradation processing target image data may be displayed on a display screen 800 in the gradation processing target image display region 880 shown in FIG. 7B. In some embodiments, as shown in FIG. 7B, hint Information input tools 810, 820, 830, 840, 850, 860 for designating a place at which the gradation processing should be performed on the gradation processing target image data displayed in the gradation processing target image display region 880 may be displayed on the display screen. The hint Information input tools may include a "return one work" tool 810, an "advance one work" tool 820, a "selection of pen for inputting hint information" tool 830, a "delete input hint information (eraser)" tool 840, a "selection of type of gradation processing" tool 850 and an "input of light source position information" tool 860 which can also called a light source position information input tool in an example shown in FIG. 7B, but is not limited thereto. In addition, FIG. 7B shows a display screen after a type of gradation processing that the user desires to perform is determined. In some embodiments, in order to input the hint information while switching plural types of gradation processing, a "switching of types of gradation processing" tool (not shown) may be provided as the hint information input tool. As a method of using the hint information input tools, for example, in the case of tone processing, hint information on a position at which the tone processing is performed may be given by actually performing designation for the position by a mouse operation by the user. For example, the user can perform a mouse operation to designate the position by adding a dot, wiring a line segment, or painting out a region, with a pointer on a place at which the user desires to perform the tone processing. When an execution button 870 displayed on the same screen is clicked by a mouse operation or the like, the gradation processing may be executed in a state in which the hint information is input, and the gradation-processed image data in which the hint information is reflected may be displayed in the gradation-processed image display region 890.

In some embodiments, as a method of using the "input of light source position information" tool 860 of the hint information input tools shown in FIG. 7B, when the "input of light source position information" tool 860 is selected (e.g., by a mouse operation or a keyboard operation), designation for a light source position by the user may be received by displaying an animation for designating the light source position as shown in FIG. 5A or FIG. 5B in the gradation processing target image display region 880 in an overlap manner. In some embodiments, designation for a light source position may be received by moving to another screen for designating the light source position as shown in FIG. 5A or FIG. 5B. When an execution button of the display screen is clicked in a state in which the light source position information is input, the gradation processing may be executed in a state in which the light source position information is input, and gradation-processed image data in which the light source position information is reflected may be displayed in the gradation-processed image display region 890.

Figure 8:
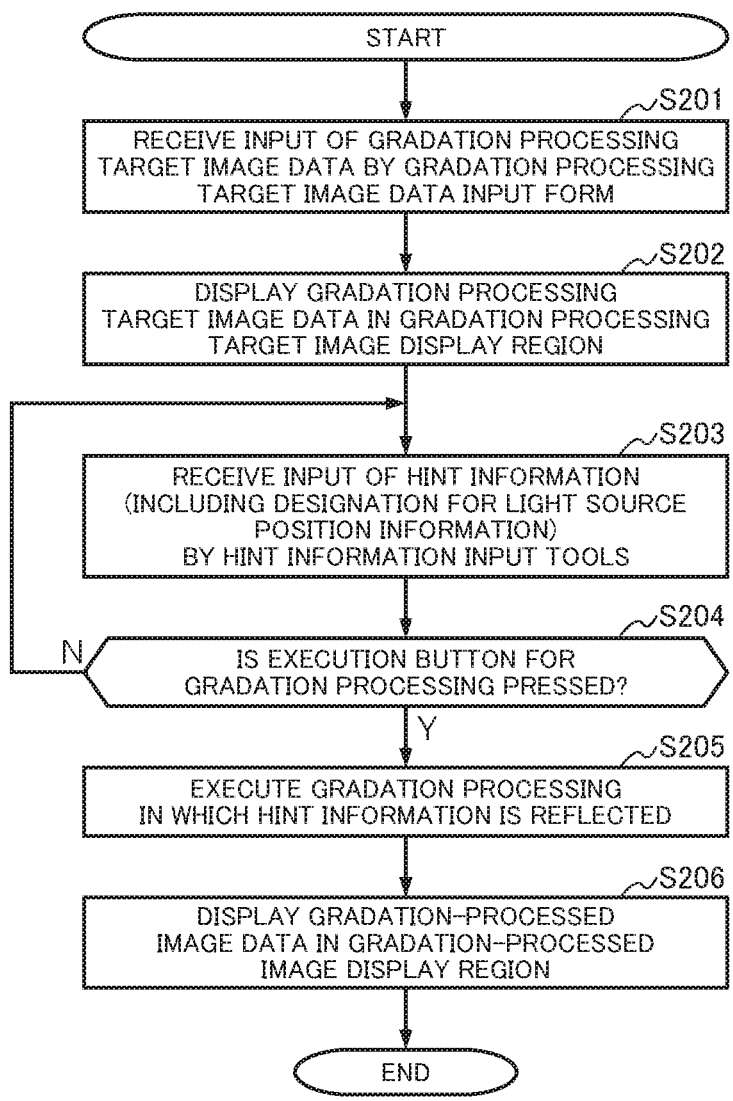
FIG. 8 is a flowchart showing a flow of processing in the case of providing an automatic gradation processing tool based on a GUI according to the second embodiment.

FIG. 8 is a flowchart showing a flow of processing in the case of providing an automatic gradation processing tool based on a GUI according to the second embodiment. A flow of processing for providing an automatic gradation processing tool may be started by displaying the gradation processing target image data input form (e.g., the form 710) on the display screen (e.g., the display screen 700 in FIG. 7A) of the display of the terminal device from the server device and receiving the input of the gradation processing target image data (step S201), as shown in FIG. 8. When the user inputs the gradation processing target image data, the gradation processing target image data may be transmitted to the server device. In the server device receiving the gradation processing target image data, the gradation processing target image data may be displayed in the gradation processing target image display region 880 of the display screen (step S202). Next, the input of the hint information using the hint information input tools (e.g., the tools 810-870 in FIG. 7B) for the gradation processing target image data displayed on the display screen may be received (step S203). In some embodiments, designation for the light source position information may be received in step S203. In some embodiments, a type of gradation processing has been determined up to a step before the hint information is received. Then, it may be determined whether or not an execution button (e.g., the button 870 in FIG. 7B) for the gradation processing is pressed (step S204). When the execution button for the gradation processing is not pressed (S204-N), a flow may return to step S203 to further receive the input of the hint information. When the execution button for the gradation processing is pressed (S204-Y), the gradation processing in which the hint information is reflected may be executed (step S205). The execution of the gradation processing in step S205 may be the same as a flow of the gradation processing according to the first embodiment described with reference to the flowchart of FIG. 6, and the same processing as steps S101 to S105 in FIG. 6 may be executed in step S205. Finally, the gradation-processed image data obtained by the gradation processing may be displayed in the gradation-processed image display region (e.g., the display region 890 in FIG. 7B) of the display screen (step S206), and the processing ends.

As described above, in some embodiments, the GUI may be provided from the server device to the display screen of the display of the terminal device, the automatic gradation processing tool may be provided to the user by the GUI, and the gradation processing target image display region and the gradation-processed image display region may be provided on the same display screen as a function of the GUI. Therefore, the user can compare and observe the original gradation processing target image data and the gradation-processed image data, and thus, it is possible to directly compare a gradation characteristic of an image before the gradation processing and a gradation characteristic of an image changed after the gradation processing with each other. In addition, the hint information for designating the place at which the gradation processing should be performed on the gradation processing target image indicated by the gradation processing target image data displayed in the gradation processing target image display region can be input, such that the gradation processing can be executed in a state in which the hint information is added. Therefore, it is possible to easily and effectively give the hint for the place at which the user desires to perform the gradation processing on the gradation processing target image to execute the gradation processing. Since the addition of the hint information does not determine the execution of the gradation processing for the place, but causes the learned model to execute the gradation processing in a state in which the hint information is input, the gradation processing is not necessarily performed on the designated place. Since learning is performed in a learning process of a learned model used by an automatic gradation processing program in the state in which the hint information is input, it can be determined how the designated hint information is adopted by a tendency of training data and the hint information used for the learning. Such adoption of the designated hint information by a learning process using training data to execute gradation processing at the designated place according to embodiments of the present disclosure is a feature completely different from gradation processing in the conventional image editing software or the like.

Third Embodiment

In the second embodiment, the information processing device for providing the graphical user interface used at the time of using the automatic gradation processing device 10 has been described, but, in some embodiments, the automatic gradation processing device 10 and the automatic gradation processing program according to the present disclosure can also be incorporated into drawing creation software, image editing software, a WEB service (hereinafter, also referred to as editing software) for providing a service equivalent to these software from a server device to a terminal device, and the like. In some embodiments, the editing software itself may include all components of the automatic gradation processing device 10. For example, the editing software may include a learned model. In some embodiments, the editing software in the terminal device may be connected to the automatic gradation processing device 10 including a learned model provided in the server device through the communication network to use components of the automatic gradation processing device 10.

The editing software including the drawing creation software or the image editing software may have a function of creating the gradation processing target image data or a function of adding the gradation processing target image data. In some embodiments, the editing software has a configuration in which the creation of the gradation processing target image data or the addition of the gradation processing target image data are managed by a plurality of layers, such that the gradation processing target image data is created or added in a specific layer. In some embodiments, in the editing software, there is a function of forming a closed region within a layer and performing specific processing only within the closed region, for example, a painting-out function, a hatching processing function or the like. The automatic gradation processing program according to some embodiments of the present disclosure may be incorporated into the editing software having the configuration and the functions as described above, such that more multifunctional editing software can be provided.

For example, it is possible to execute the gradation processing by the automatic gradation processing program on gradation processing target image data created based on the function of the editing software or added gradation processing target image data. Through the configuration as described above, it is possible to execute the gradation processing on the gradation processing target image data created by the editing software or the gradation processing target image data fetched into the editing software, and it is possible to further edit the gradation-processed image data obtained based on various functions of the editing software.

In some embodiments, when it is possible to manage the functions of the editing software using a plurality of layers, it is possible to output mask channels obtained as the gradation processing result based on the automatic gradation processing program to a specific layer. That is, since it is possible to output the mask channel to a layer different from a layer in which original gradation processing target image data is disposed, it can be determined whether or not to apply the gradation processing by switching turn-on/off of a display of the layer. In some embodiments, when the gradation processing result is output as a plurality of mask channels, it is possible to divide and output all of the mask channels to different layers. In some embodiments, when information of different textures is included for each applied tone in tone processing, after the gradation processing result is output to the layer of the editing software, it is possible to edit for changing a tone into a tone of a texture different from a type of a tone designated when the gradation processing result is output as the mask channel.

In addition, it is possible to execute the gradation processing by the automatic gradation processing program only on a specific layer by using the functions managed by the plurality of layers in the editing software. By using the functions as described above, the gradation processing target image data can be separately written into different layers for each part of the gradation processing target image data, and the gradation processing can be executed in a unit of a part, such that it is possible to finally obtain edited image data in which all the layers are superimposed. For example, a layer relating to gradation processing target image data of a person and a layer relating to gradation processing target image data of a background are provided, and each gradation processing is performed and then superimposed, such that it is possible to finally obtain one piece of image data.

In some embodiments, it is possible to execute the gradation processing by the automatic gradation processing program only in the region closed in the layer using the function of forming the closed region within the layer and performing the specific processing only within the closed region. When an image drawn in the closed region is recognized as one gradation processing target image data, the gradation processing can be applied particularly within the closed region without technical difficulty. It is possible to execute the gradation processing only in a region selected by the user by the function as described above.

As described above, by applying the automatic gradation processing program according to the present disclosure to the existing editing software, it is possible to further perform editing on the gradation-processed image indicated by the gradation-processed image data subjected to the automatic gradation processing based on the editing software. In some embodiments, it is possible to execute the automatic gradation processing in a unit of the layer or in a unit of the closed region within the layer, such that it is possible to provide editing software having an automatic gradation processing function that further improves user's convenience. The editing software having the automatic gradation processing function as described above can have the possibility of contributing to efficiency of the gradation processing work as a whole by allowing a part of the gradation processing work to be executed based on the automatic gradation processing program in a production site of computer graphics and animation.

In the first to third embodiments, it has been described that the learned model is generated and obtained by performing the learning for each type of gradation processing such as the shadow color processing, the highlight processing, the oblique line drawing processing, and the tone processing, but the number of learned models prepared for each type of gradation processing need not be one. A plurality of learned models (preferably, a plurality of learned models in which tendencies of training data used for learning are different from each other) may be prepared for each type of gradation processing to allow the user to be able to select which of the learned models is used to perform the gradation processing. In addition, in the first to third embodiments, it has been described that the learned model is generated and obtained by performing the learning for each type of gradation processing such as the shadow color processing, the highlight processing, the oblique line drawing processing, and the tone processing, but one learned model that can deal with any gradation processing may be obtained by learning one model for all types of gradation processing.

In the first to third embodiments, it has been described that the automatic gradation processing device 10 includes the hint information acquiring unit 12 and the light source position information acquiring unit 13, but the present disclosure is not limited thereto. In some embodiments, the automatic gradation processing device 10 may include only any one of the hint information acquiring unit 12 and the light source position information acquiring unit 13. In some embodiments, the automatic gradation processing device 10 may not include either of the hint information acquiring unit 12 or the light source position information acquiring unit 13. Even in the case in which the automatic gradation processing device 10 does not include either of the hint information acquiring unit 12 or the light source position information acquiring unit 13, when the learning is performed so that the gradation processing can be appropriately executed in a state in which the hint is not given at the time of the learning of the learned model, it is possible to appropriately execute the gradation processing.

In the first to third embodiments, it has been described that at least one or more mask channels for performing the gradation processing are output as the gradation processing result from the learned model, the present disclosure is not limited thereto, and the gradation-processed image data may be obtained by directly synthesizing the gradation processing result with the gradation processing target image data. In this case, the learning of the learned model is performed so that the gradation processing result can be directly synthesized with the gradation processing target image data.

What is claimed is:

1. A data processing apparatus comprising:
one or more memories; and
one or more processors configured to:
obtain image data of an object;
obtain light source information indicating at least one of a position or a direction of a light source;
perform image editing of applying a light effect corresponding to the at least one of the position or the direction of the light source to the object in the image data, by processing the image data and the light source information using a neural network system including at least one or more neural networks that have parameters to apply the light effect to the object in the image data, wherein the processing of the image data and the light source information inputs the image data and the light source information into the neural network system to perform the image editing,
wherein the obtained image data includes first pixel data and second pixel data, and the neural network system for the light effect processes the first pixel data by using at least the second pixel data.

2. The data processing apparatus according to claim 1, wherein the one or more processors are configured to display the image data of the object to which the light effect has not been applied and the image data of the object to which the light effect has been applied.

3. The data processing apparatus according to claim 2, further comprising a display device,
wherein the one or more processors are configured to display the image data of the object to which the light effect has not been applied and the image data of the object to which the light effect has been applied on the display device.

4. The data processing apparatus according to claim 1, wherein the light source information is obtained through a tool provided for a user to designate the at least one of the position or the direction of the light source.

5. The data processing apparatus according to claim 4, wherein the light source information is obtained through the tool displayed in a region where the obtained image data is displayed in an overlapping manner.

6. The data processing apparatus according to claim 4, wherein the one or more processors are configured to:
display, on a display device, an image object provided for the user to select the tool;
display the tool on the display device based on selecting of the image object; and
obtain the light source information indicating the at least one of the position or the direction of the light source, the light source information being designated by the user through the displayed tool.

7. The data processing apparatus according to claim 1, wherein the neural network system for the light effect performs a convolution operation on a plurality of pixel data included in the obtained image data.

8. The data processing apparatus according to claim 1, wherein the image editing includes gradation processing for adding gradation information to the image data based on the at least one of the position or the direction of the light source, or gradation processing for changing gradation information included in the image data based on the at least one of the position or the direction of the light source.

9. The data processing apparatus according to claim 1, wherein the one or more processors are configured to extract a feature quantity of the obtained image data from the obtained image data by using the neural network system and perform the image editing based on at least the extracted feature quantity and the obtained light source information indicating the at least one of the position or the direction of the light source.

10. The data processing apparatus according to claim 1, wherein the image editing includes at least one of processing for adding a shadow based on the at least one of the position or the direction of the light source or processing for changing gradation information in the image data based on the at least one of the position or the direction of the light source.

11. The data processing apparatus according to claim 1, wherein the neural network system outputs the image data of the object to which the light effect has been applied by performing the image editing.

12. The data processing apparatus according to claim 1, wherein the neural network system outputs at least channel information based on at least the image data and the light source information, and the one or more processors are configured to generate the image data of the object to which the light effect has been applied based on at least the image data and the at least channel information.

13. The data processing apparatus according to claim 12, wherein the one or more processors are configured to generate the image data of the object to which the light effect has been applied by changing gradation information included in the image data based on the at least channel information.

14. The data processing apparatus according to claim 12, wherein the one or more processors are configured to generate the image data of the object to which the light effect has been applied by overlapping the at least channel information with the image data.

15. The data processing apparatus according to claim 1, wherein the light source information is three-dimensionally given for the image data.

16. The data processing apparatus according to claim 15, wherein the light source information is given by designating a position on a surface of a sphere.

17. The data processing apparatus according to claim 1, wherein at least a portion of the neural network system has been trained by using light source information indicating at least one of a position or a direction of a light source and corresponding correct answer image data.

18. The data processing apparatus according to claim 1, wherein the one or more neural networks have been trained to update the parameters in order to apply the light effect to the object in the image data.

19. The data processing apparatus according to claim 1, wherein the one or more processors are configured to process the image data and the light source information using the neural network system including at least the one or more neural networks to perform the image editing of applying the light effect to the object in the image data, at least by:
obtaining feature of the image data including the light source information, based on the image data and the light source information; and
inputting the feature of the image data including the light source information, into at least a part of the one or more neural networks.

20. The data processing apparatus according to claim 1, wherein the one or more neural networks have the parameters to apply a light effect corresponding to input light source information to an object in input image data based on the input image data and the input light source information.

21. The data processing apparatus according to claim 1, wherein the one or more processors are configured to perform the image editing without using any other image data of the object with different light source information, by processing the image data and the light source information using the neural network system provided before obtaining the image data.

22. The data processing apparatus according to claim 1, wherein the parameters of the at least one or more neural networks have been learned using other image data of an object different than the object in the image data.

23. The data processing apparatus according to claim 1, wherein the parameters of the at least one or more neural networks are used to apply the light effect to a different object in different image data.

24. The data processing apparatus according to claim 1, wherein the one or more processors configured to obtain the light source information based on automatically discriminating the light source position from the image data.

25. The data processing apparatus according to claim 1, wherein the one or more processors are configured to output, by the processing of the image data and the light source information, at least mask data indicating one or more portions in the image data to which the light effect is to be applied, and use the output mask data to perform the image editing of applying the light effect to the object in the image data.

26. The data processing apparatus according to claim 25, wherein the one or more processors are configured to output the mask data to a second layer that is layered on top of a first layer including the image data, and superimpose the second layer including at least the mask data on the first layer including the image data to perform the image editing of applying the light effect to the object in the image data.

27. A data processing apparatus comprising:
one or more memories; and
one or more processors configured to:
display photographic image data of a person on a display device;
display, on the display device on which the photographic image data is being displayed, a tool for designating at least one of a position or a direction of a light source used to apply a light effect to the person; and
display, on the display device, the photographic image data of the person to which the light effect has been applied by using a neural network system including at least one or more neural networks that have parameters to apply the light effect to the photographic image data, the light effect corresponding to the at least one of the position or the direction of the light source designated by a user through the displayed tool, wherein the applying of the light effect is performed by inputting the photographic image data and light source information indicating the at least one of the position or the direction of the light source into the neural network system including the at least one or more neural networks, wherein the photographic image data includes first pixel data and second pixel data, and the neural network system for the light effect processes the first pixel data by using at least the second pixel data.

28. The data processing apparatus according to claim 27, wherein the one or more processors are configured to receive a designation of the at least one of the position or the direction of the light source from the user through the displayed tool to apply the light effect to the person.

29. The data processing apparatus according to claim 27, wherein the one or more processors are configured to display the tool in a region where the photographic image data is displayed in an overlapping manner.

30. The data processing apparatus according to claim 27, wherein the user inputs the photographic image data by designating a file path or by drag and drop.

31. The data processing apparatus according to claim 27, wherein the one or more processors are configured to manage the photographic image data as a first layer, output a second layer for applying the light effect to the person based on the at least one of the position or the direction of the light source designated by the user, and display, on the display device, the photographic image data of the person to which the light effect has been applied, by superimposing the second layer on the first layer.

32. The data processing apparatus according to claim 31, wherein the one or more processors are configured to control whether or not to apply the light effect to the person, by switching on/off of a display of the second layer.

33. The data processing apparatus according to claim 27, wherein the light effect is not applied to a background of the person in the photographic image data where the light effect has been applied to the person.

34. The data processing apparatus according to claim 27, wherein the one or more processors are configured to generate the photographic image data of the person to which the light effect has been applied, based on the at least one of the position or the direction of the light source, using a trained neural network model.

35. The data processing apparatus according to claim 27, wherein the one or more processors are configured to retain the photographic image data of the person to which the light effect has not been applied after displaying the photographic image data of the person to which the light effect has been applied, so that the user can compare the photographic image data of the person to which the light effect has not been applied and the photographic image data of the person to which the light effect has been applied.

36. The data processing apparatus according to claim 28, further comprising the display device.

37. A data processing method executed by one or more processors, comprising:
concurrently displaying, on a display device, photographic image data of a person and a tool for designating at least one of a position or a direction of a light source used to apply a light effect to the person;
receiving, from a user through the displayed tool, a designation of the at least one of the position or the direction of the light source to apply the light effect to the person; and
displaying, on the display device, the photographic image data of the person to which the light effect has been applied by using a neural network system including at least one or more neural networks that have parameters to apply the light effect to the photographic image data, the light effect corresponding to the at least one of the position or the direction of the light source designated by the user through the displayed tool, wherein the applying of the light effect is performed by inputting the photographic image data and light source information indicating the at least one of the position or the direction of the light source into the neural network system including the at least one or more neural networks,
wherein the photographic image data includes first pixel data and second pixel data, and the neural network system for the light effect processes the first pixel data by using at least the second pixel data.

* * * * *